United States Patent [19]
Cosenza et al.
[11] Patent Number: 4,553,302
[45] Date of Patent: Nov. 19, 1985

[54] INSTALLATION TOOL, TANGLESS HELICALLY COILED INSERT

[75] Inventors: Frank J. Cosenza, San Pedro; Albert K. Yamamoto, Huntington Beach, both of Calif.
[73] Assignee: Rexnord Inc., Brookfield, Wis.

[21] Appl. No.: 581,837
[22] Filed: Feb. 21, 1984
[51] Int. Cl.[4] .................... B23P 19/04
[52] U.S. Cl. .................... 29/240.5; 81/443; 81/450
[58] Field of Search .................... 29/240.5; 81/440, 441, 81/442, 443, 444, 450, 445

[56] References Cited

U.S. PATENT DOCUMENTS

| | | | |
|---|---|---|---|
| 1,676,775 | 7/1928 | Doherty | 81/443 |
| 1,699,306 | 1/1929 | Millen | 81/443 |
| 2,385,357 | 9/1945 | Haas . | |
| 2,390,515 | 12/1945 | Cram et al. . | |
| 2,390,545 | 12/1945 | Lang . | |
| 2,392,843 | 1/1946 | Eckener . | |
| 2,584,118 | 2/1952 | Forster . | |
| 2,586,805 | 2/1952 | Forster . | |
| 2,969,588 | 1/1961 | Stephens . | |
| 3,093,895 | 6/1963 | Eddy | 29/240.5 |
| 3,348,293 | 10/1967 | Newton et al. . | |
| 3,602,975 | 9/1971 | Thurston | 29/240.5 |

FOREIGN PATENT DOCUMENTS

| | | | |
|---|---|---|---|
| 441233 | 2/1927 | Fed. Rep. of Germany | 81/444 |

OTHER PUBLICATIONS

Heli-Coil Screw Thread Inserts Bulletin 900, 1970.
Heli-Coil Power Inserting Tools Bulletin 859-B, 1970.

*Primary Examiner*—James L. Jones, Jr.

[57] ABSTRACT

An insertion tool for a helically coiled wire insert of the type used for tapped holes in parent material that is generally softer than a fastener being screwed into the tapped hole, whereby a mandrel having a threaded lead portion and a pivotal pawl inserted in a groove below the threaded portion so that the pawl engages a recess of the insert, in order that the insert may be screwed into the tapped hole. The pivotal pawl also permits removal and reinsertion of the tool after the coil insert has been installed.

4 Claims, 12 Drawing Figures

INSTALLATION TOOL, TANGLESS HELICALLY COILED INSERT

BACKGROUND OF THE INVENTION

This invention relates to a tool for installing wire coil screw thread inserts and, more particularly, to an improved installation tool for tangless wire coil inserts.

Tools for the installation of wire coil inserts having at one end a diametrical tang of its end convolution so arranged so that the tang can be gripped by the tool as it projects from the coil for installation into a tapped hole, are well known. Further, inserting tools for tangless wire coil inserts as described in U.S. Pat. No. 2,586,805 are also known in the art.

The prior art insertion tools, however, as shown in the U.S. Pat. No. 2,586,805, generally comprise a complicated device in which the coil end is gripped by a plurality of gripping elements which press the lead coil inwardly while the tangless wire coil insert is inserted into the tapped hole. These prior art devices require many moving parts and additional operations before the coil is inserted in the tapped hole.

Thus, there exists a need for an inserting tool for tangless wire coil inserts that is less costly to manufacture and more simple to operate.

SUMMARY OF THE INVENTION

The present invention is directed to a tool for inserting tangless helically coiled inserts in tapped holes and comprises a sleeve member having a rotatable and axially movable mandrel, threaded at one end, insertable therein, and a pivotal catch located in a cutout near the threaded end portion of the mandrel for installing the insert in the tapped hole. Counterclockwise rotation of the tool allows the catch to automatically disengage for extraction of the tool.

Accordingly, it is an object of the present invention to provide an insertion tool with a threaded mandrel and pivotal pawl which snaps into the notch located on the lead coil of a tangless wire coil insert, thus minimizing the time required to insert said coil insert in a tapped hole.

A further object of the present invention is to provide a reliable installation tool with a minimum of moving parts both for ease of manufacture and ease of use.

A still further object of the present invention is to provide an installation tool which can be removed and reinserted in the insert if necessary.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

The present invention is particularly adapted for use with tangless coils which are used, for example, where a steel alloyed bolt having conventional threads is desired to be fastened into a material of relatively softer alloy, such as aluminum.

Figure 1:
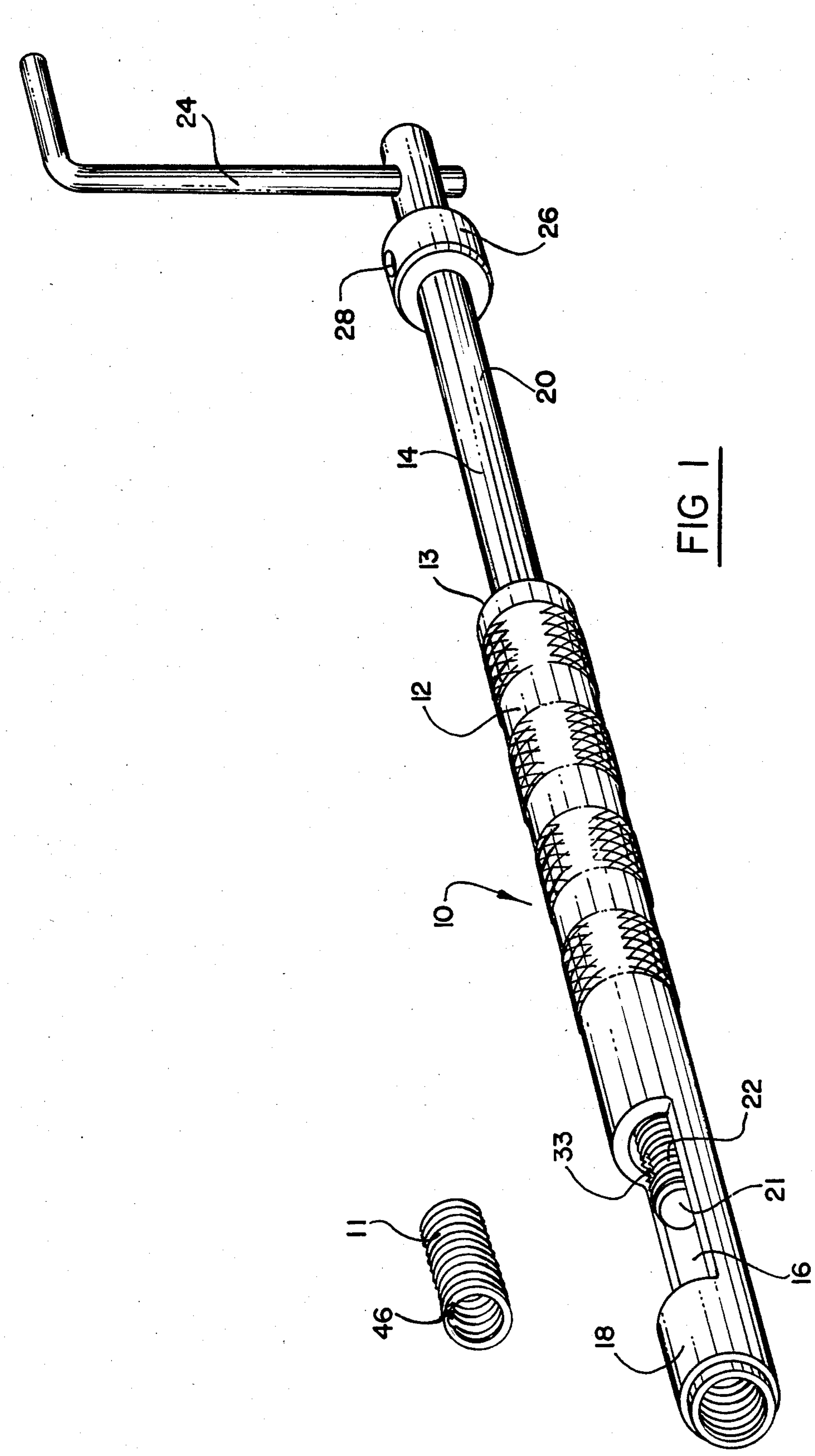
FIG. 1 is a perspective view of a tangless helically coiled insert installation tool in accordance with the present invention.
Figure 2:
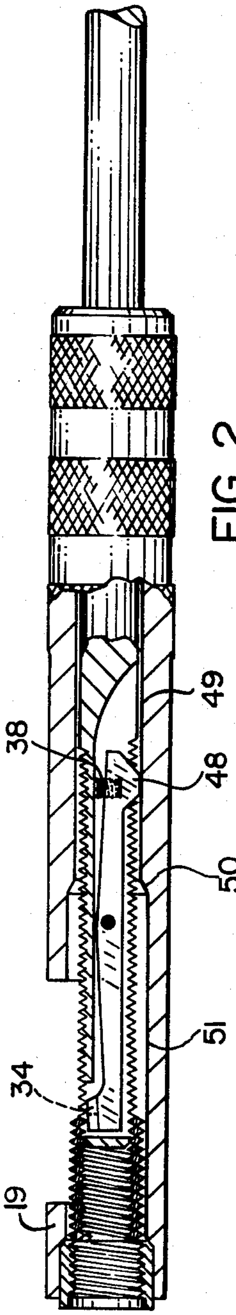
FIG. 2 is a side elevation, partially broken away, of one embodiment of the tool of FIG. 1 with the pawl pivtoed inwardly.

As illustrated in FIG. 1, the installation tool 10 of the present invention is comprised of two major portions: a tubular body member 12, and a mandrel assembly 14 insertable into the tubular body and adapted to receive a tangless insert which is to be threaded into a tapped hole. The tubular body member 12 provides, in part, the operator with a means for supporting the mandrel assembly 14 in order to install the insert correctly during operation. The tubular body member 12 may include a loading window 16, for supporting an insert for quick reloading, a coil alignment portion 19, and a coil sizing portion 18 which reduces the coil thread diameter for smooth transition into the tapped hole.

The mandrel assembly 14, as shown in FIGS. 2-7 is insertable into the tubular body member 12 and is adapted to receive the tangless insert for installation into a tapped hole. The mandrel assembly 14 comprises a cylindrical rod 20 of a diameter substantially equal to the inner diameter of the tubular body member 12. The lead end 22 of the rod 20 is threaded and has a diameter according to the inner diameter that insert 11 will have when it is in its contracted state. This means the diameter of lead end 22 is somewhat smaller than the inner coil diameter of insert 11 prior to the application of the tool. At the end opposite the lead end there is generally a crank handle 24 for applying torque for installing the insert into a tapped hole. The crank handle 24 may be replaced at the driver end of the cylindrical rod 20 with a shaped portion, to which a wrench may be applied.

Figure 4:
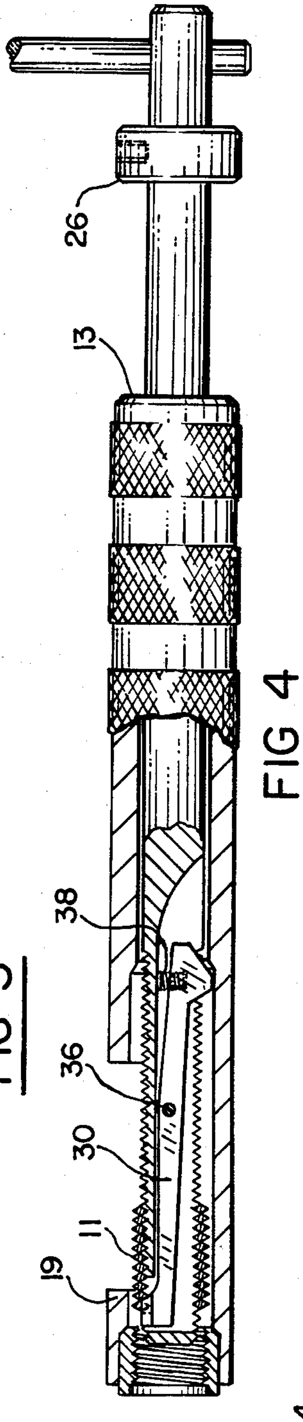
FIG. 4 is a side elevation of FIG. 2 after the helical coil insert is inserted into the coil alignment portion of the prewinder and after the pawl is pivoted outwardly.

Further, as illustrated in FIGS. 1 and 4, an adjustable stop collar 26 serves as an abutment with the end portion 13 of movable tubular body member 12, thereby limiting the distance that the lead end 22 of the rod 20 may project out of the coil sizing portion 18 of the tubular body member 12, thus defining the proper depth to which the insert 11 may be installed in a tapped hole. A set screw 28 or other means is provided in the adjustable stop collar 26 to secure the stop in its proper position.

In FIGS. 2–5 and 7 a pivotable catch or pawl 30, constructed in accordance with one embodiment the invention is illustrated in an elevation sectional view within a longitudinal cutout 32 of mandrel assembly 14. The cutout 32 generally does not extend through the front end 21 of the rod 20, but is generally equal in length to the pawl 30. The pawl 30 is biased within the cutout 32 so that a hook portion 34 protrudes through aperture 33 and engages the recess 52 of the tangless wire coil insert 11. The pawl is generally biased about pivot point 36 by spring 38 to locate the hook portion 34 into the recess of the insert when the insert is screwed onto the lead end 22 of the mandrel assembly 14 and the mandrel assembly 14 is axially moved in the tubular body 12 so that the cam means 48 moves from the smaller inner diameter portion 49 of tubular body 12 along ramp 50 to the larger inner diameter 51.

Figure 10:
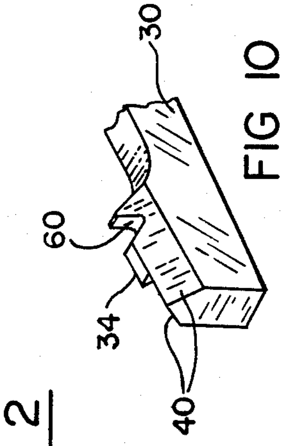
FIG. 10 is a perspective view of another embodiment of the pawl of the present invention.
Figure 3:
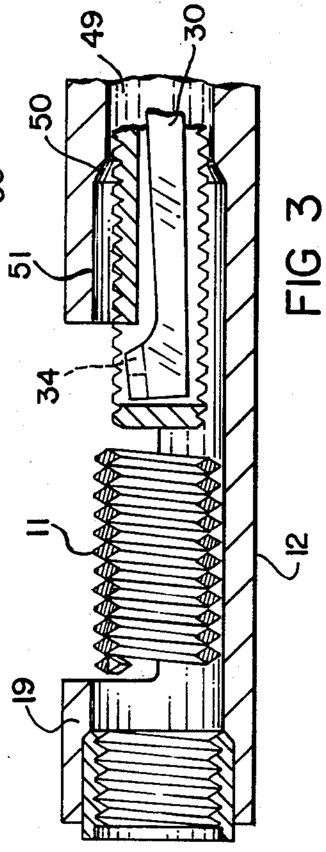
FIG. 3 is an enlarged sectional view of the lead end of the tool of FIG. 2 prior to prewinding the helical insert with the pawl pivoted inwardly.
Figure 6:
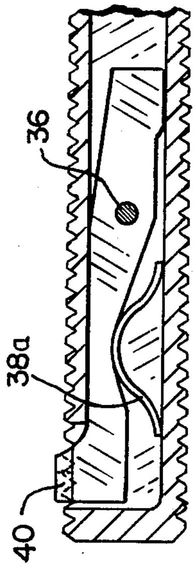
FIG. 6 is an enlarged elevation of the pawl (with some details omitted) of another embodiment of the present invention.
Figure 5:
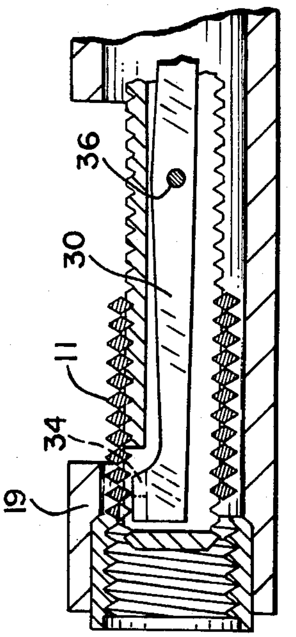
FIG. 5 is an enlarged elevation view of the lead end of FIG. 4.
Figure 9:
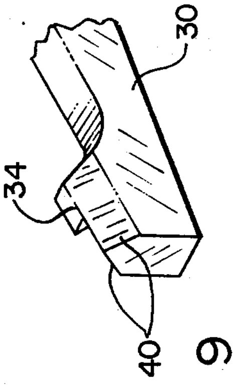
FIG. 9 is a perspective view of another embodiment of the pawl of the present invention.
Figure 12:
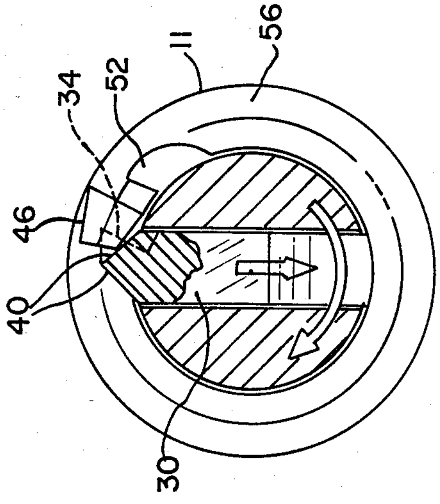
FIG. 12 is a sectional elevation view, with some details omitted, partially broken away, showing the reinstallation of the tool of the present invention as it is rotated past the recess of the trailing end of an installed helical coil insert.

An alternate biasing means of the pivotal pawl 30 is illustrated in FIGS. 6 and 9–10. In this embodiment the hook portion 34 of the pawl with lead ramps 40 and the spring 38*a* are both located on the same side of pivot point 36. In this embodiment the cam means 48 and ramp 50 are not necessary since the ramp 40 in combination with the truncated end portion 46 of the insert provides a camming means for pivoting the pawl 30 inwardly. Use of the ramps 40 with the pivotal pawl 30 shown in FIGS. 2–5 and 7 would also eliminate the cam means 48 and ramp 50. Accordingly, the important feature of the pivotable pawl 30 is that it has the ability to locate the hook portion 34, which generally extends between two peaks of the threaded portion of the lead end 22 of the rod, only in the recess of the insert 11 to threadably drive the insert 11 into a tapped hole. Further, counter rotation of the cylindrical rod 20 allows the pivotal pawl 30 to automatically disengage from the recess of the insert to permit extraction of the tool. As shown in FIG. 9, ramps 40 may be provided adjacent but opposite the hook portion 34 so that the recess of the insert 11 may automatically push the pawl 30 downward upon counter clockwise rotation of the cylindrical rod 20, and thus providing an automatic extraction of the tool 10.

FIG. 10 shows another embodiment of the pivotable pawl 30 in which a notch 60 is rearwardly adjacent the hook portion 34. This notch 60 captures the inner thread of the next adjacent thread to the lead thread of the insert to prevent the recess 52 of the insert from slipping off the hook portion 34 when rearward axial force is applied to the insert.

Figure 7:
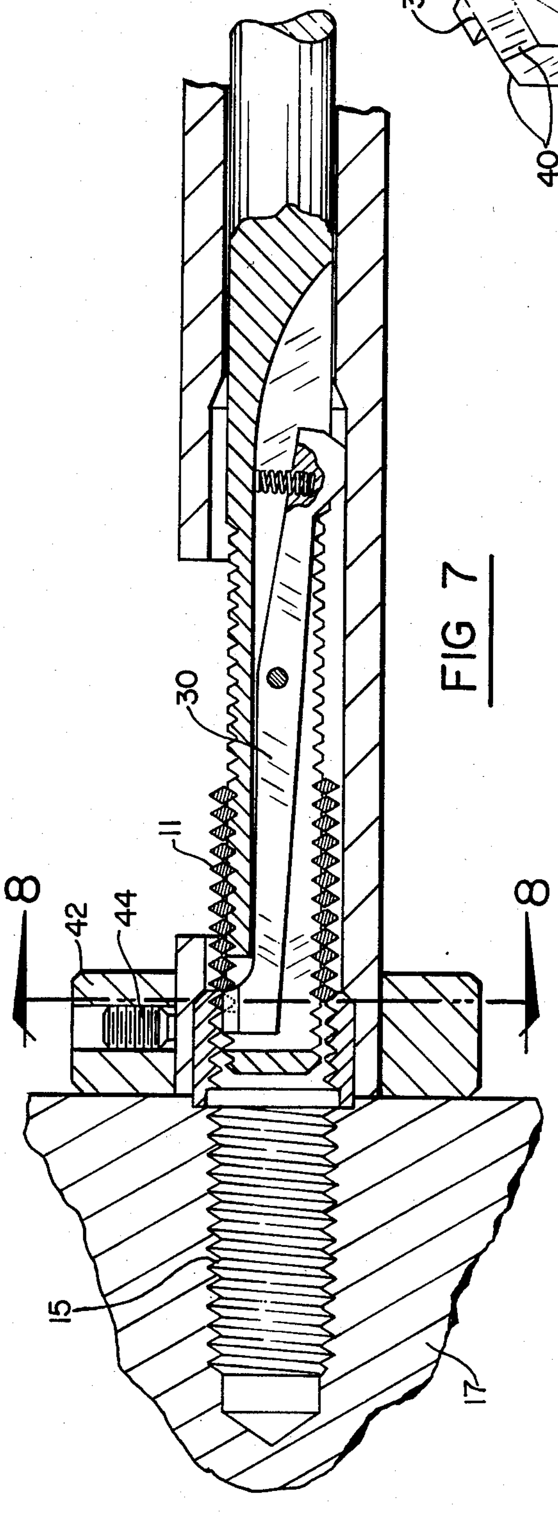
FIG. 7 is a side elevation of the tool of the present invention showing the position of the parts prior to the installation of the tangless insert into a tapped hole.

A stabilizing collar 42, as illustrated in FIG. 7, serves as a means for insuring perpendicularity of the tool 10 when it is held in abutment to a tapped hole 15 in parent material 17. A set screw 44 is provided in stabilizing collar 42 to secure the tool in a stable position in order to install the insert 11 in the tapped hole 15.

Figure 8:
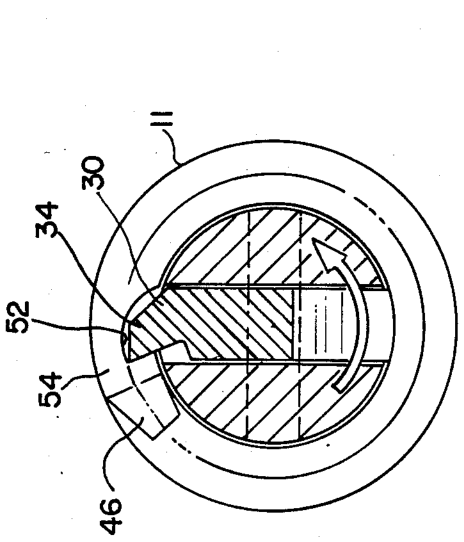
FIG. 8 is a sectional view, with some details omitted, taken along lines 8—8 of FIG. 7.

As illustrated in FIG. 8, the hook portion 34 of the pawl 30 engages the recess 52 of the lead end 54 in order that the insert 11 may be screwed by means of the tool 10 into a tapped hole. Since both free ends of the helical coiled insert have recesses 52 cut therein, the insert may be inserted in the tool in either direction, thus eliminating the possibility of the operator inserting insert on the tool in the wrong direction.

Figure 11:
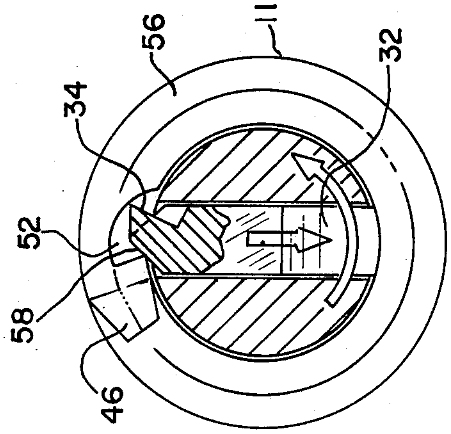
FIG. 11 is a sectional elevation view, with some details omitted, looking to the left of FIG. 7, showing the removal of the tool as it is rotated past the recess of the trailing end of the helical coil insert.

In FIGS. 10–11 is illustrated the insertion tool embodying the novel features of the present invention, showing the trailing end 56 of the insert 11. FIG. 10 shows the tool in a counter clockwise rotation, whereby the opposite side 58 of the hook portion 34 of the pawl is angled to pivot the pawl 30 in a downward direction as indicated by the arrow. This pivotal motion of the pawl 30 against the recess 52 of the trailing end 56 of the coil allows removal of the tool after the insert has been installed in a tapped hole. FIG. 11 also illustrates the tool of the present invention from the trailing end 56 of the coil, but during reinsertion of the tool after an insert 11 has been installed. Accordingly, the ramp portion 40 of the pivotal pawl 30 cooperates with a truncated portion 46 of the free end of the insert 11 to push the pawl 30 in a downward direction, shown by the arrow, when the tool is rotated in a clockwise direction for reinsertion of the tool. During reinsertion of the tool 10 the pivotal pawl 30 moves along the inner surface of the coil past the truncated portion of the coil, past the recess 52 of the trailing portion of the coil axially along the insert until the hook portion 34 of the pawl again engages the recess at the lead end of the coil.

We claim:

1. A tool for inserting a tangless helically coiled insert in a tapped hole, the helically coiled insert having at least one free end with a recess in the inner thread of the free end, said tool comprising:

a tubular body of substantially circular cross-section, said body including a portion at one end thereof having an aperture therein adapted to receive a tangless helically coiled insert;

a mandrel insertable into said tubular body and adapted to receive the tangless insert for installation in the tapped hole, said mandrel having a portion with a cavity therein and further including, driving means at one end for applying a torque sufficient to install the insert in a tapped hole, a threaded portion at an end opposite said driving means and adjacent said body aperture for threading the tangless helically coiled insert thereupon, and means for engaging said mandrel within the insert for simultaneous movement of said mandrel and the insert, said means including a pivotable pawl having a laterally projecting hook means biased in a first direction and extending longitudinally in said mandrel cavity adjacent said mandrel threaded portion, said pawl having a free end with laterally projecting means thereon for automatically locating said pawl within the insert at the insert recess as said mandrel is rotated in a clockwise direction, with said pawl locating means disengaging automatically form the insert when said mandrel is rotated in a counterclockwise direction, with said pawl free end moving in a direction opposite said first biased direction as a result thereof.

2. A tool as claimed in claim 1, further including a coil sizing means abutting from and adjacent said thread portion including a tubular portion having an aperture therethrough for receiving the tangless helically coiled insert, therethrough and a countersink locating means for stabilizing the installation tool in the tapped hole.

3. A tool as claimed in claim 1 or 2, further including a ringlike stabilizer means circumscribed about one end of said tubular body having a face for contacting a substantial portion of the parent material around the tapped hole.

4. A tool as claimed in claim 1 wherein said mandrel means for engaging the insert further includes means for preventing disengagement of said laterally projecting hook means with the insert recess when a rearward axial force is applied to the insert.

* * * * *